May 2, 1950     A. TAUB     2,506,250
INTERNAL-COMBUSTION ENGINE

Filed April 22, 1946     3 Sheets-Sheet 1

Inventor:
Alex Taub,

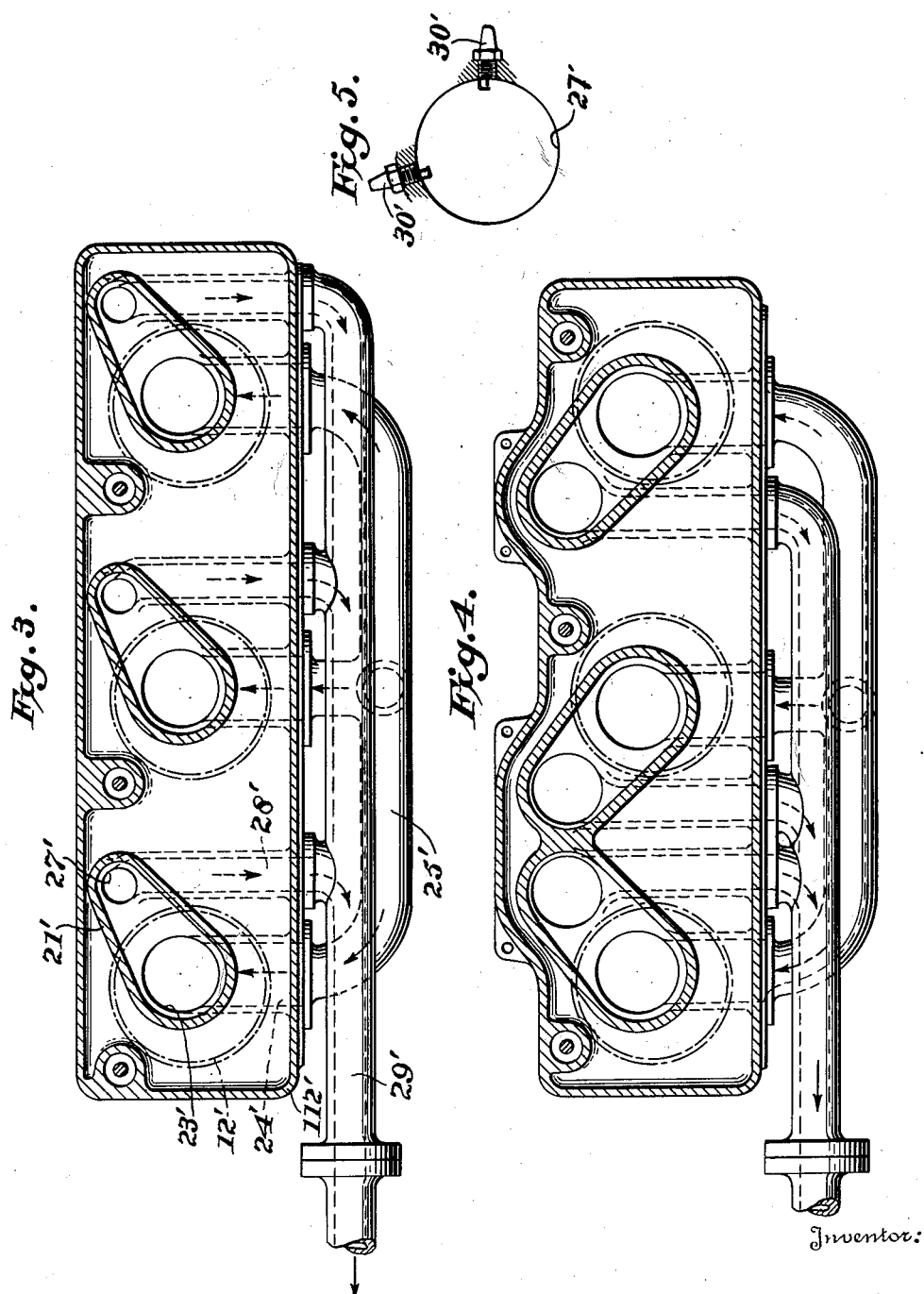

Patented May 2, 1950

2,506,250

UNITED STATES PATENT OFFICE 2,506,250

INTERNAL-COMBUSTION ENGINE

Alex Taub, Washington, D. C., assignor to Taub Engine Corp., Washington, D. C., a corporation of Delaware Application April 22, 1946, Serial No. 664,046

6 Claims. (Cl. 123—56)

My invention relates to improvements in internal combustion engines and more especially, to a novel engine construction which will provide an effective combination of maximum performance, structural rigidity and compactness. My invention is particularly directed to an engine having a low fuel consumption which will operate on a maximum useful compression ratio and thereby make full use of the available high octane fuels. Further, my invention provides an engine in which combustion is controlled to a maximum degree, detonation and shock are minimized, and in which the destructive effects of shock and detonation, if present at all, are readily absorbed and minimized by reason of the special construction and arrangements of the engine parts.

It is a further object of my invention to provide a thin engine occupying a minimum of space, presenting a clean appearance at its top so that the various engine accessories, which are normally overcrowded around an engine, may readily be disposed on the top thereof and be easily accessible for inspection and repair. An additional and special feature of my invention consists in providing an engine comprising two banks of horizontally disposed, staggered cylinder bores, whereby the space between adjacent cylinder bores resulting from the offset position of the bores is efficiently utilized for the location of the exhaust valves and passages. Further objects and advantages of my invention will be pointed out as the description thereof proceeds.

Recent improvements in the production of fuels for internal combustion engines necessitate a new approach in the design and construction of engines in order to make maximum use of the increased anti-knock potentialities of the new fuels. Commercial engines, more especially, should be designed to give a maximum performance without lowering the durability of the engine components and should permit good operation with a wider range of fuels, from low octane to high octane, inasmuch as engines of the future may have to operate all over the globe, where the available fuels may differ widely in character.

The trend in the recent improvements in fuels, for commercial internal combustion engines, has been in the direction of higher octane values, increased power per pound of fuel, or a combination of both of these characteristics. In order to advantageously exploit the increase in octane rating and derive maximum benefit from fortified fuels which permit the use of higher maximum pressures, the engine should operate at high compression ratios and provision must then be made for dealing with higher rates of pressure rise in the engine cylinders. This follows from the fact, that a high compression ratio decreases the combustion time and simultaneously increases the resultant maximum pressure. The combination of these two factors produces maximum roughness and gives rise to kinetic forces, the integrated effect of which is to cause excessive bending of the crankcase and crankshaft.

In accordance with one feature of my invention, this injurious bending effect in the engine is offset by structural means embodying the principle of materially increasing the cross-sectional area of the engine in relation to its length. To this end, I provide a flat engine comprising two opposed banks of horizontal cylinders. The number of cylinders will, of course, vary in accordance with particular requirements, e. g. engine output, but this principle of design may be equally applied to 4-cylinder, 6-cylinder, 8-cylinder, 12-cylinder engines or any even number of cylinders. A flat engine of this type will give a decrease in length with an increase in cross-sectional area and will exhibit a material increase in structural rigidity without an increase in weight. The additional rigidity thus obtained is also highly effective in resisting deflections due to the dynamic forces inherent in the operation of the engine. In the case of many present day in-line types of engines, dynamic deflections are produced in the engine which may be briefly summarized as follows: The ends and top of the engine are relatively still, while at the center and bottom of the engine the crankcase and cylinder barrels swing like a bell. As stated above, my flat engine embodying an opposed cylinder arrangement will effectively neutralize these swinging movements.

In addition to minimizing the effects of combustion shock by the provision of a flat engine structure as described, I further reduce the detrimental effects of such shock by controlling it at its source, namely, the combustion chamber. As hitherto explained in my prior Patents 2,133,592, issued October 18, 1938, and 2,214,941, issued September 17, 1940, the rate of pressure rise during the combustion of the charge is an important factor in determining shock and engine roughness. In accordance with my present invention, engine roughness is effectively controlled, if not substantially eliminated, by decelerating the rate of pressure rise after about 25% of the contents of the combustion chamber have been burnt. In order to carry out this control of the rate of pressure rise, I provide a cylinder having a combustion chamber of a shape that will give a maximum opportunity for the control of the volume distribution of the charge and the flame front. My combustion chamber is of uneven depth and has the general shape of the combustion chamber described in my prior Patent 2,133,592. More particularly, and in accordance with my present invention, the volume distribution in the combustion chamber about the ignition device is such as to provide a diminishing flame front area after about 25% of the volume of the charge has been burnt. Additional control of the combustion can be provided by the use of multiple spark plugs suitably located within the combustion chamber.

In order that my engine be adapted for use in various parts of the world, where fuels may differ widely in octane rating, I provide the combustion chamber of my engine with a large quench region for the last portion of the combustible charge whereby detonation of this charge is precluded, as explained in detail in my previous patents mentioned above.

Additional objects, features and advantages of the present invention are set forth in the following description of two illustrative embodiments of my engine, diagrammatically shown in the accompanying drawings, in which:

Figure 3 illustrates diagrammatically the relative positions of parts of the engine shown in detail in Figures 1 and 2;

Figure 4 is a similar diagrammatic view pertaining to a modified engine construction in which the position of the combustion chambers is different from that shown in Figure 3;

Figure 5 is a diagram of a detail.

Figure 1:
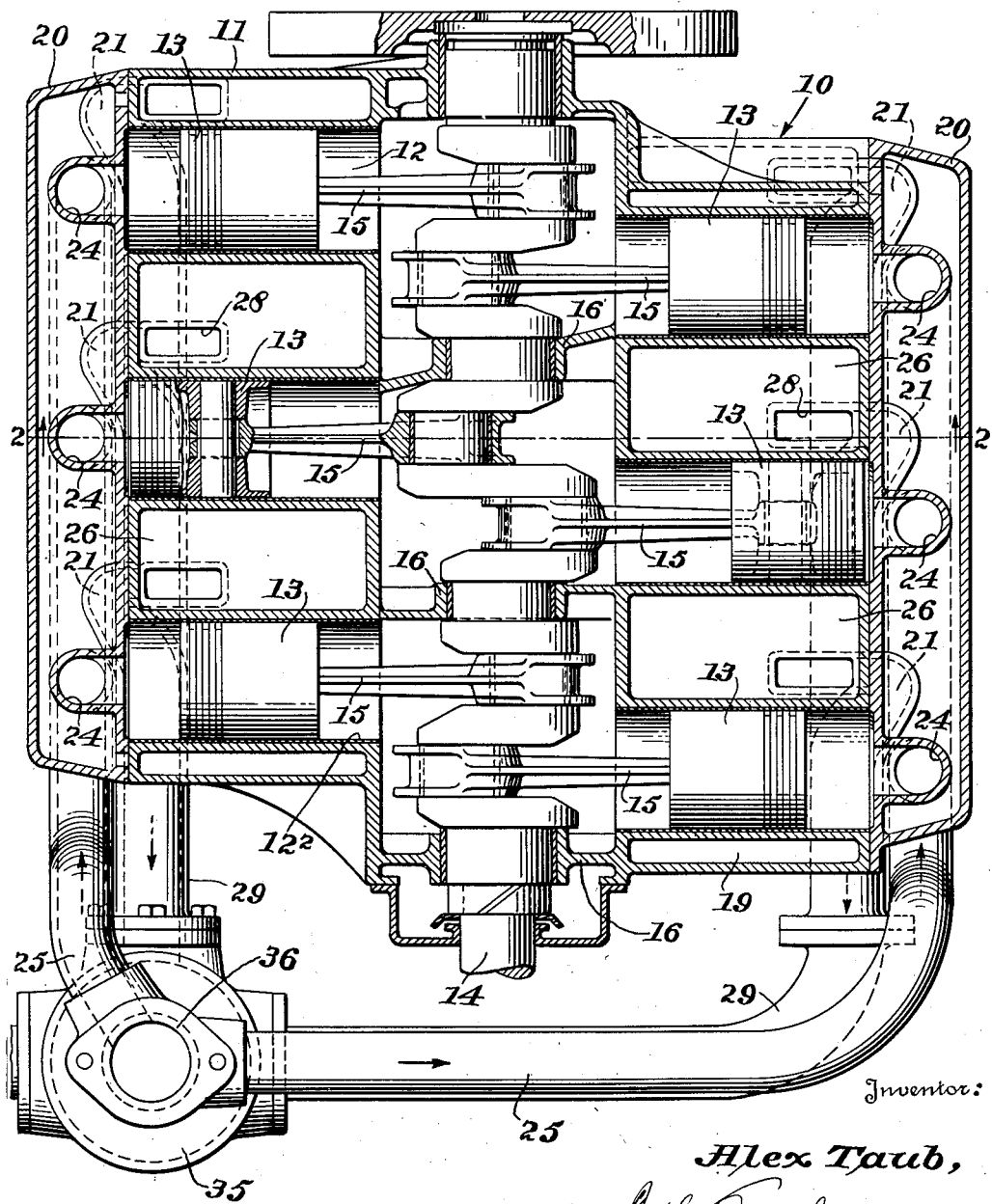
Figure 1 is a plan view, partly in section, of one embodiment of my invention.

In the drawings, numeral 10 designates the engine in its entirety. It comprises a one-piece block 11 having a top wall 111 and a bottom wall 112 and having two banks of horizontally disposed, opposed cylinder bores 12, each bore being provided with a suitable liner $12^2$; the latter is especially useful in the case of engines made of aluminum. In the example of the invention herein illustrated, the engine is of the 6-cylinder type, but my invention is equally applicable to an engine having any even number of cylinders. The engine block may be either of cast aluminum, cast iron or fabricated steel. The cylinders are provided, as usual, with cooling jackets 19. Pistons 13 operate in the cylinder bores, the pistons being connected to the centrally disposed crankshaft 14 by means of the connecting rods 15. As will be apparent from Figure 2, the axis of the crankshaft 14 is displaced downwards with respect to the cylinder bores, i. e., being offset in relation to the horizontal plane passing through the centers of the cylinder bores. By reason of this arrangement, the rigidity of the upper portion of the engine block is enhanced and, in addition, the position of the cams for operating the engine valves can be lowered, thereby contributing still further to the thinness of the engine. The crankshaft is supported in bearings 16 suitably provided in the downwardly opening crankcase 17, which is formed integral with the engine block 11, and disposed centrally thereof. An oil pan 18 is removably secured to the lower, open end of the crankcase.

In accordance with an important feature of my invention, the open recess provided on either side of the engine and defined by substantially right-angular extending walls, i. e. by the bottom wall 112 of the engine block and the lateral projecting walls 113, 114 of the centrally disposed crankcase and oil pan respectively, is utilized for the disposition of the intake and exhaust manifolds, air cleaner and carburetor, all of the latter being arranged within the confines of the recess as will be described in detail hereafter.

Figure 2:
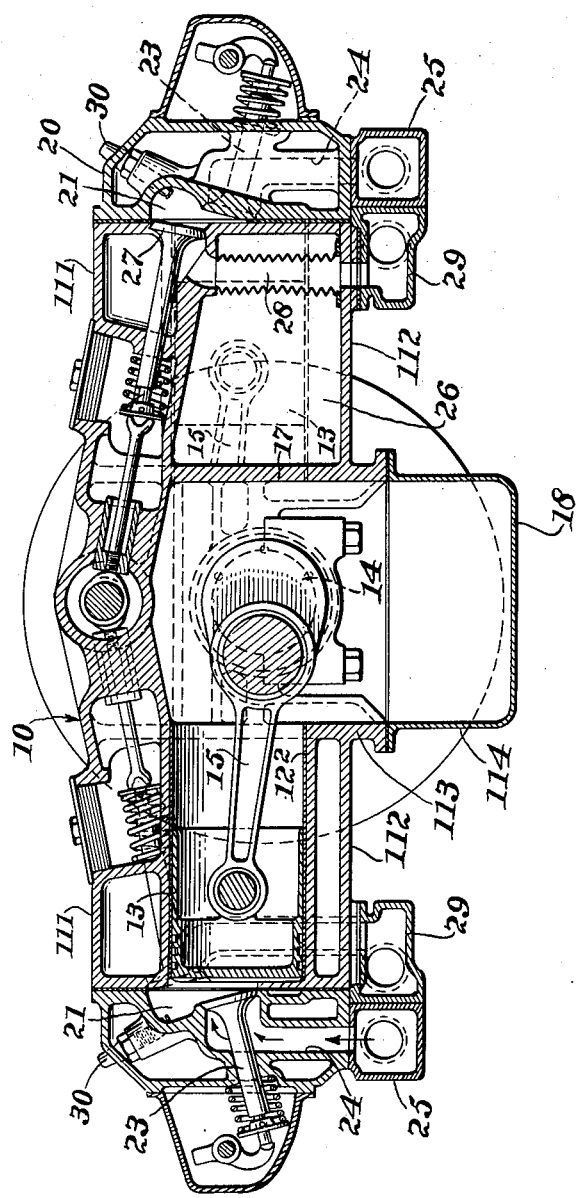
Figure 2 is a sectional end view along line 2—2 of Figure 1.

Detachably secured to each bank of cylinders is a cylinder head 20, provided with a combustion chamber 21 for each cylinder. The cylinder heads are provided with an intake valve 23 and an intake passage 24 for each cylinder and the passages 24 are suitably connected to an intake manifold 25, attached to the lower wall of the cylinder head, as shown in Figure 2. By reference to Figure 1, it will be observed that the center lines of opposed cylinder bores do not coincide. That is, in my engine, the bores of corresponding opposed cylinders are offset from each other and in staggered relation so as to provide spaces or compartments 26 in the engine block between each pair of adjacent cylinders in the same bank. In accordance with a special feature of my invention, the exhaust valve 27 and exhaust passage 28 for each cylinder are disposed in the engine block in the respective spaces or compartments 26 provided by the offset relation of the cylinder bores. By reason of this particular disposition of the exhaust valve and passage, the thickness or depth of the engine block and head considerably narrowed and enables me to obtain a truly flat or thin engine, despite the fact that the exhaust valve is positioned within the cylinder block. Further, and as will be observed from an inspection of Figure 2, the exhaust passage 28 in the block is inverted, so that this exhaust passage extends toward the bottom of the engine where the exhaust passage communicates with the exhaust manifold 29 suitably secured to the lower wall 112 of the engine block. The intake passage 24 in the cylinder head follows a similar course, thereby enabling the intake manifold 25, as well as the exhaust manifold 29, to be placed contiguous with the under surface of the cylinder head and of the engine block respectively, and on either side of the centrally disposed oil pan 18, thus further reducing the height of the engine. This advantageous arrangement is possible because the space between the cylinders is utilized for the exhaust passages. In contrast to prior constructions, the ability to place the manifolds on the under surface of the engine block, and without an increase in the depth of the engine, results in providing a clean, unencumbered engine top, which allows the ready disposal thereon of accessories, e. g. fuel pump, distributor, etc., that are normally overcrowded. This is an especially important consideration because, it enables emergency repairs to be carried out readily and without mistake even by an unskilled person. As shown in Figure 2, the intake manifold 25 is located in front of exhaust manifold 29 in the direction of the cylinder head and these manifolds 25 and 29 are contiguous to each other at the point of attachment to the respective intake and exhaust passages so as to promote a good heat transfer relationship between the two manifolds. In this manner, the heat in the exhaust gases is effectively utilized to preheat, vaporize or dry the incoming charge as it enters the cylinder. More especially, this provides for reheating the precipitated wet ends in the combustible mixture going into the cylinders without overheating the air.

The intake manifold from each bank of cylinders join on to a hot box 35 to which are also jointed the two exhaust manifolds. The hot box is provided with a flange 36 to support a down draft or side draft carburetor. The hot box is so constructed as to form a preliminary heating chamber of the fuel mixture entering the inlet manifolds. That is, the hot box or exhaust heater comprises a jacket through which flow a regulated amount of the exhaust gases, the latter serving for the initial heating of the combustible intake mixture passing through the hot box. By reason of the low location of the inlet manifolds, i. e. below the bottom wall of the engine, the carburetor does not extend above the top of the engine.

The particular low location of the carburetor and, especially, its position relatively to the engine and the exhaust manifolds enables me to obtain a very important operating result, that is, a material reduction in the so-called "underhood" temperature. That is, in the conventional engine, the air which is taken into the carburetor is drawn in through the radiator grille and has to pass over the engine and exhaust manifolds; as a result, it is not uncommon for such air to have its temperature raised during the summer by as much as 80 or 90° F. This is a very serious drawback from several standpoints. In the first place, the weight of air drawn into the cylinder per stroke is diminished. Second, due to the high initial temperature of the air thus preheated, the final temperature of the compressed mixture rises to a very high value and brings about detonation of the mixture. The serious effect of this temperature rise will be readily appreciated when it is realized, that a temperature increase of only 5° F. of a fuel mixture above a critical value is sufficient to cause detonation. This troublesome phenomenon is completely eliminated in my engine where the carburetor, whether placed to the front or the rear of the engine, draws in "road" air which has been effectively shielded from the exhaust manifolds by the corresponding intake manifolds, and not air that has had its temperature appreciably increased by engine heat. The lower "underhood" temperature renders possible an extension in the design limits of the engine, since it permits the use of higher compression ratios, resulting in a better utilization of the fuel, thereby leading to a reduction in fuel costs and to a general improvement in the operating economics of the engine.

As mentioned above, the engine may be made of either cast iron, cast aluminum or fabricated steel. However, this type of engine lends itself particularly to aluminum construction. In this last case, the cylinder head and cylinder block can be made of aluminum while the exhaust passages 28 will be of pressed steel cast in place. In a preferred construction, the exhaust passage 28 will consist of a preformed, corrugated, e. g. accordion pleated, steel tube, as shown in Figure 2, to provide desired flexibility for overcoming the difference in expansion between the steel tube and the aluminum casting of the block, both during the casting of the parts as well as during the normal operation of the engine. The steel exhaust passage will also provide a highly heat resistant structure, which will successfully withstand the high operating temperatures.

The engine illustrated herein comprises the so-called F-head valve combination, wherein the intake valve is in the cylinder head and the exhaust valve is placed in the cylinder block. As described above, by offsetting the bores of opposing cylinders, the resultant spaces between the cylinder bores are advantageously utilized as locations for the exhaust valves and passages, thereby materially reducing the thickness or depth of the engine block and head.

As heretofore stated, the cylinder head of my engine is so constructed as to afford a maximum control of combustion therein. The combustion chamber is of uneven depth and its contour is generally shaped in accordance with the principles disclosed in my prior Patents 2,214,941 and 2,133,592. More particularly, I minimize roughness of combustion in my engine by disposing the deeper portion of the combustion chamber in the neighborhood of the ignition plug 30 and adjacent the exhaust valve, and the volume distribution in the chamber about the ignition plug is such, as to provide a diminishing flame front area after about 25% of the volume of the charge has been burnt. In accordance with another feature of my construction, the combustion chamber is disposed substantially along a straight line joining the center of the intake valve, center line of piston and the center of the exhaust valve. With a view more particularly of controlling detonation, the combustion chamber of the present invention embodies the combination of the following features:

The main portion of the combustion chamber extends from approximately the center of the piston to the area around the exhaust valve; the remainder of the combustion chamber forms a quench region in accordance with the disclosures in my aforementioned patents, said region embodying a low ratio of volume-to-surface whereby detonation of the last portion of the combustible charge is avoided. This quench region covers a substantial portion of the piston area, preferably more than about 50% thereof. The intake valve is disposed at the end of the main portion of the combustion chamber, remote from the exhaust valve, approximately within the region where two-thirds of the combustible mixture has been burnt and outside of the quench region. The ignition plug 30 is disposed above the exhaust valve. Where two ignition plugs are used for each cylinder, the plugs 30', 30' are likewise mounted above the exhaust valve, being spaced from each other along an arc less than 180° F., as diagrammatically shown in Figure 5.

The combustion chamber is only wide enough for a single valve at each end and yet, the general disposition and combination of elements in my combustion chamber is such as to permit the use of large valves without crowding, since the valves are not placed side by side, and thus enable maximum free access of the gases to the valves.

As diagrammatically illustrated in Figure 3, the combustion chamber for each cylinder bore extends in a direction which is generally inclined to the horizontal plane passing through the centers of the cylinder bores. In the embodiment of my engine illustrated in Figures 1 to 3, all the combustion chambers extend in the same direction. Another desirable arrangement is that shown in Figure 4, in which the combustion chambers are arranged as rights and lefts.

Figures 3 and 4 illustrate diagrammatically the relative positions—in plan—of certain parts of the engine. Referring to Figure 3, the dotted line circles 12' represent the cylinder bores, while the full lines 21' designate the outlines of the combustion chambers when viewed in the direction of the roof thereof. The intake valve ports are designated 23' and the exhaust valve ports 27'. The intake passages which are here designated 24' open into the bottom wall 112' of the engine, as do also the exhaust passages 28' of the several cylinders. As shown in Figure 3, the intake passages 24' connect with an intake manifold schematically illustrated and designated as 25' while the exhaust passages 28' connect with an exhaust manifold which is here schematically illustrated and designated 29'. Figure 3 clearly brings out (1) the disposition of the exhaust ports 27' and exhaust passages 28' in the space between adjacent cylinders, and (2) the downward inverted flow of the exhaust gases in the engine block and into the exhaust manifold 29'.

Figure 4 represents a diagrammatic view similar to that of Figure 3 in the case of the other embodiment of my invention referred to above, namely, one in which the combustion chambers are arranged as rights and lefts relative to their respective cylinders. Except for this deviation, the arrangement of the parts is otherwise substantially similar to that shown in Figures 1, 2, and 3, with such modifications as are required to accommodate the right-hand and left-hand relative position of the combustion chambers.

The engine described above is especially fitted for use in modern truck and busses where the ideal position for the engine is under the flat platform in the central part of the chassis. My engine also fits ideally into passenger cars having front wheel drive as it permits the engine to be mounted ahead of the front wheels and, being short, does not overhang appreciably. My engine is also eminently suited for vehicles provided with rear engine drives because it is compact and easily accessible for inspection, adjustments and repairs.

In summary of the foregoing: My engine, by reason of its structure as described herein, possesses a maximum of rigidity so that it makes for a sound commercial construction even when an aluminum crankcase is used. Despite its compactness, the engine is provided with valves of maximum size. These desirable construction features are effectively combined with a combustion chamber structure specially shaped so as to provide maximum control of combustion whereby shock and detonation are reduced to a minimum. In turn, this is reflected in the permissible use of a high compression ratio with a resulting low fuel consumption, and in an efficient utilization of the presently available high quality fuels.

I claim:

1. An internal combustion engine block having a top wall and a bottom wall and comprising two horizontally disposed banks of opposed cylinder bores having the bores of corresponding opposed cylinders offset from each other, thereby providing compartments in said block between adjacent cylinders in the same bank, a cylinder head for each of said cylinder banks provided with combustion chambers, intake passages and intake valves disposed in said cylinder heads, an exhaust port and communicating exhaust passage for each of the cylinders arranged in said compartments, and exhaust manifolds attached to the lower wall of said block and communicating with said exhaust passages.

2. An internal combustion engine according to claim 1, provided with intake manifolds attached to the lower wall of the engine block and communicating with the inlet passages, said intake manifolds being disposed in heat transfer relationship with the exhaust manifolds at spaced positions to provide for the initial heating of the combustible intake mixture and for the reheating thereof prior to its entry into the cylinder.

3. An internal combustion engine according to claim 1 having a downwardly opening crankcase formed integral with the engine block, a crankshaft disposed in said crankcase, the axis of the crankshaft being displaced downwards in offset relation to the horizontal plane passing through the center of the cylinder bores.

4. An internal combustion engine according to claim 1 having a downwardly opening centrally disposed crankcase formed integral with the engine block, an oil pan secured to the lower open end of the crankcase, providing thereby a recess on either side of the engine block and engine manifolds disposed within the confines of each recess.

5. An internal combustion engine provided with cylinders, inlet manifolds and exhaust manifolds for the fuel mixture and the exhaust gases respectively according to claim 1, said inlet and exhaust manifolds comprising a single hot box provided with independent passages for the fuel mixture and the exhaust gases, said passages being disposed in heat transfer relationship, a carburetor supported on said hot box and in communication therewith, whereby the fuel mixture from the carburetor is initially heated, means disposed adjacent the cylinders for effecting a separate and additional heat transfer between the fuel mixture and the exhaust gases, whereby the fuel mixture is reheated immediately prior to its inlet into the cylinders.

6. An internal combustion engine block having a top wall and a bottom wall and comprising two horizontally disposed banks of opposed cylinder bores, compartments in said block between adjacent cylinders in the same bank, a cylinder head for each of said cylinder banks provided with combustion chambers, intake passages and intake valves disposed in said cylinder heads, intake manifolds located below the bottom wall of the engine block attached to the cylinder heads and communicating with said intake passages, an exhaust port and communicating exhaust passage for each of the cylinders arranged in each said compartment of the engine block, exhaust manifolds attached to the lower wall of said block and communicating with said exhaust passages, said intake manifolds being placed in front of the exhaust manifolds in the direction of the cylinder head, whereby air flowing about the cylinder head is shielded from the exhaust manifolds, and a carburetor located below the top wall of the engine block and communicating with said inlet manifolds.

ALEX TAUB.

REFERENCES CITED

The following references are of record in the file of this patent:

UNITED STATES PATENTS

| Number | Name | Date |
| --- | --- | --- |
| 869,021 | Roberts | Oct. 22, 1907 |
| 1,318,471 | Amonsen | Oct. 14, 1919 |
| 1,407,850 | Farr | Feb. 28, 1922 |
| 1,605,382 | Wirrer | Nov. 2, 1926 |
| 1,697,723 | Gigli | Jan. 1, 1929 |
| 1,757,399 | Taub | May 6, 1930 |
| 1,764,147 | Burtnett | June 17, 1930 |
| 2,133,592 | Taub | Oct. 18, 1938 |
| 2,311,146 | Wiegman | Feb. 16, 1943 |